Dec. 27, 1955

H. T. HOFFMAN 2,728,832

RESISTANCE THERMOMETER

Filed March 26, 1953

INVENTOR.
HOWARD T. HOFFMAN
BY
Raymond W. Jenkins
ATTORNEY

Dec. 27, 1955  H. T. HOFFMAN  2,728,832
RESISTANCE THERMOMETER
Filed March 26, 1953  2 Sheets-Sheet 2

INVENTOR.
HOWARD T. HOFFMAN
BY
Raymond W. Junkins
ATTORNEY

United States Patent Office 2,728,832
Patented Dec. 27, 1955

2,728,832

RESISTANCE THERMOMETER

Howard T. Hoffman, Mentor, Ohio, assignor to Bailey Meter Company, a corporation of Delaware Application March 26, 1953, Serial No. 344,814

5 Claims. (Cl. 201—63)

This invention is directed to improvements in resistance thermometers which expose their resistance wire elements so directly to the condition to be measured that they have been frequently referred to as "bare-bulb" thermometers.

The increase of electrical resistance of a wire associated with a condition increasing in temperature is a fundamental phenomena. It has long been known that a wire element, associated with a variable temperature condition to be measured, may be incorporated into a balanceable electric network in order that subsequent unbalance of the network, due to changes in the resistance of the wire, will reflect the degree of the temperature of the condition. The present invention is concerned with associating the resistance wire element of these thermometers with changing temperature conditions in order to transmit the variations rapidly to the wire while mechanically protecting it from other factors at the condition.

The primary concern, of the present invention, is the mounting of a resistance wire in a manner which will electrically insulate it while isolating it from foreign material which would tend to short across sections of the wire but which will prevent mechanical stresses from being set up in the body of the wire. Generally speaking, the art of mounting resistance wires for the purpose of temperature measurement has been consistently developed. The present invention is concerned with a particular class of these mountings wherein the resistance wire of the thermometers is embedded in a material which can then be associated very closely with a temperature condition while mechanically shielding it from detrimental factors of the condition. When a housing for a temperature responsive wire becomes so completely integrated into a combination with the wire, the resulting structure is generally regarded as the temperature "bulb" and is usually referred to as a "bare-bulb" by reason of its direct exposure to the temperature condition.

The resistance wires of these thermometers have been encased in various materials. Quartz is a leading example of a material which is resistant to high temperature and which has been used about the wires of resistance thermometers. However, an all-important consideration has limited the advance in this type of mounting. Quartz, and other materials of similar nature, protect the wire from exposure to detrimental conditions at the point of measurement, but they are applied to the wire in such manner that they grip, or hold, it tightly and set up stresses within the body of the wire which cause its variation of resistance with respect to temperature to change in a non-uniform manner. Calibration of an including electric network must be on an individual basis in these situations, and reproducibility is generally so bad, as well as hysteresis, that commercial embodiment of resistance thermometers using this mounting is impractical.

The thermocouple, as a primary element for measurement and temperature, has long exceeded the resistance thermometer in flexibility of application on several grounds. The comparatively small size of a thermocouple has made it more popular, in many cases, than the resistance thermometer because of the ease of locating it in so many otherwise inaccessible locations in industrial process. Size has thus played an important part in deciding between the use of a thermocouple or a resistance wire thermometer. The present invention is directed toward reduction of the differential in choice by offering a resistance thermometer mounting which is inherently smaller than conventional forms and which compares favorably in size with that of the thermocouple.

The thermocouple has also, as a primary element, been able to respond to higher temperatures over longer periods of time without suffering deterioration. The present invention now affords efficient protection to the wire of resistance thermometers, raising its maximum practical range to approach that of the thermocouple.

The thermocouple has always had a higher speed of response than resistance wire thermometers because of the length and temperature transmission time from the condition to the resistance wire through the necessary mechanical mounting. However, the present invention brings the resistance wire closer to the condition than has ever been done before without loss of mechanical protection. Certainly no commercially feasible form has been devised before with so many advantages.

The temperature sensitive wire of resistance thermometers is essentially a length included in a balanceable electric network from each of its ends. This inherent limitation dictates that the wire, as a longitudinal form, must be extended into, and returned from the condition. In the prior art mountings, the wire extends down the longitudinal dimension of a protecting casing, bends and returns along the same dimension of the same casing. The present invention demonstrates how it is possible to form a combination of a casing and resistance wire in order that both legs of the wire will not have to be positioned in a common casing increment. Actually, the wires extend straight through a casing, in the present invention, and the entire combination given a U-bend to return both ends of the wire from the condition. It is conceived, through the present invention, that the casing can be so reduced in size, with respect to the resistance wire, as to be only slightly larger than the resistance wire filament itself.

One form of the invention conceives the casing as extending the resistance wire straight into the condition and a return lead protected by means of a separate casing extending out to the end of the wire in the condition. However, the preferred embodiment is to give the resistance wire casing a U-bend shape. In the final analysis, it is to be noted that the wire makes but one pass through the casing, without the dual accommodation of the wire as a cross-sectional area limitation. The resulting combination including the casing and resistance wire is fundamentally more simple than conventional arrangements, for purposes of manufacture, aside from the other advantages of response, size and ruggedness.

The structure embodying the present invention also takes into account the protection of the leads extending out of the resistance wire casing. Certain detrimental atmospheric conditions have been observed as having a rapid deteriorating effect on both the material of the resistance wire and the lead from the resistance wire. An extension of the first casing is provided about the leads at the point where they emerge from the resistance casing to provide a gaseous protective layer for the leads.

The structure advanced by this disclosure is novel, in the first instance in providing a mount, or base, for a temperature responsive resistance wire which improves all the fundamental characteristics desired in primary elements of this class. A unique combination is formed of a temperature responsive resistance wire, a protecting casing for the resistance wire, and a secondary casing for protection of the leads from the resistance wire. The entire combination is adapted to being subjected to a temperature condition to be measured while maintaining the resistance wire and its leads electrically insulated from the casing, protected from detrimental factors of the condition, while rapid heat transfer through the casing to the resistance wire is promoted.

Fundamentally, the resistance wire thermometer has a greater accuracy than the thermocouple, as a primary element for temperature measurement, and the present invention preserves this fundamental advantage while associating the resistance wire more intimately with higher temperature ranges than heretofore possible with commercial forms of these resistance thermometers. The combination is quite easy to manufacture, besides offering a resistance thermometer which combines a high degree of mechanical durability, a diminutive size, a high range of temperature measurement and a high speed of response.

Figure 1:
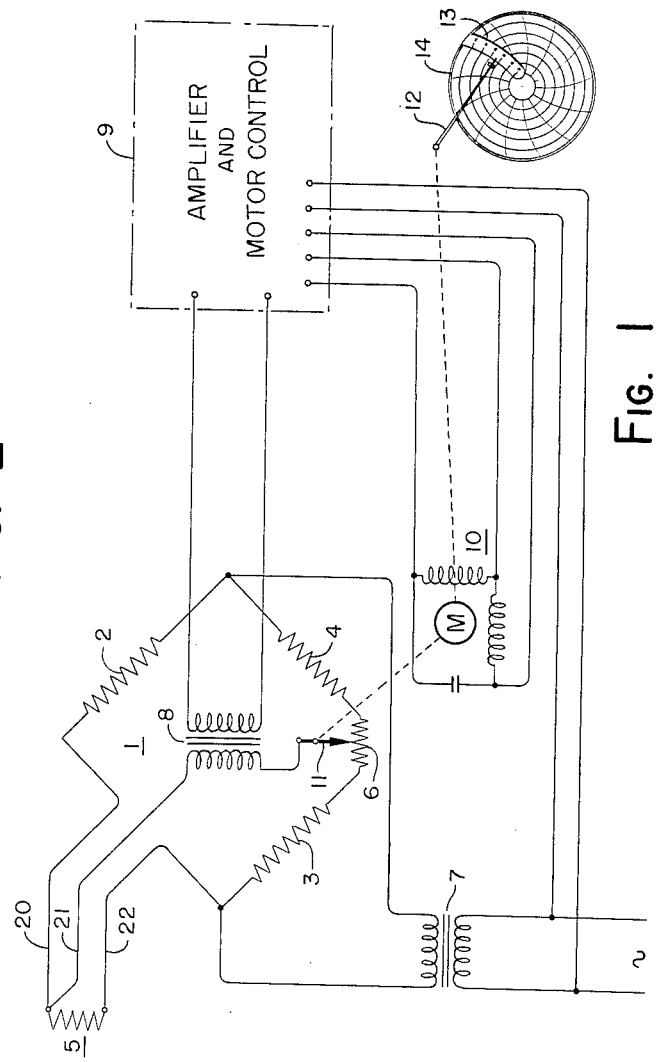
Fig. 1 is an elementary diagram of a balanceable electric network adapted to include the present invention as a temperature sensitive resistance element.

In going first to Fig. 1, there is illustrated a very elementary balanceable electric network, as specifically a Wheatstone bridge 1, having fixed resistance arms 2, 3 and 4; a variable resistance element 5 sensitive to a temperature condition to be measured; and an adjustable potentiometer resistor 6 for restoring balance to bridge 1. After the conventional manner, the bridge is energized with alternating current from a supply transformer 7. In this circuit disclosed, an output transformer 8 is connected across the bridge by conjugate conductors opposite the bridge supply. The output transformer 8 then supplies an amplifier and motor control circuit 9 which directly controls the speed and direction of rotation of a motor 10. In this specific embodiment of a balanceable electrical network, the motor 10 is shown as a capacitor-run motor arranged to mechanically position a contactor 11 along the resistance 6 for restoring balance to the bridge 1 as such unbalance is transmitted to the amplifier and motor control at 9. Simultaneously, with the positioning of contactor 11, the motor 10 positions an indicating-recording pen 12 relative to a scale 13 and a chart 14.

The foregoing basic arrangement of the network provides that a change in the temperature to be measured, sensed at 5, results in a change of the resistance of the wire at 5. With the change in resistance of the wire at 5, the energized bridge 1 becomes unbalanced. The resulting unbalance is amplified at 9 and is imposed upon the motor control circuit at the same location for positioning the motor 10 in one direction or the other. The mechanical link between motor 10, contactor 11 and pen 12 causes the bridge to be balanced and the motion needed to attain this balance recorded as a change to the new temperature.

Figure 2:
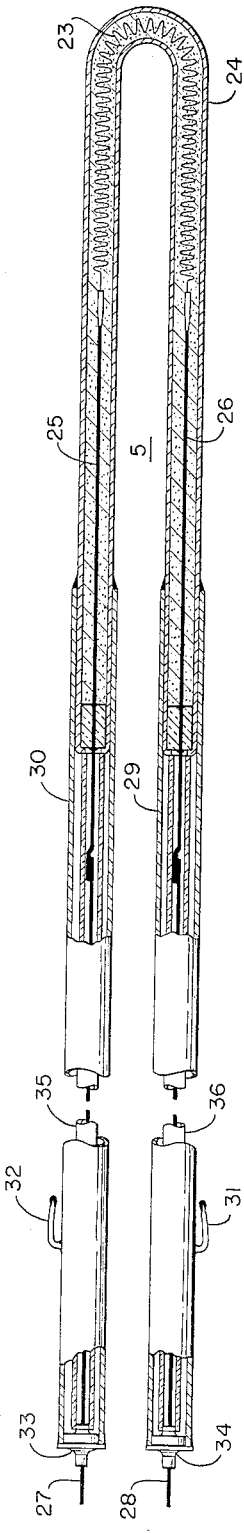
Fig. 2 is a partially sectioned elevation of part of the preferred form of the invention.

As discussed in the introductory remarks, the resistance wire shown at 5 is included in a particular, novel structure. Fig. 2 illustrates many of the essential elements of the combination. I shall first designate the complete structure, including the resistance wire, by 5. The leads, necessary to connect the balanceable electric network with the resistance wire will be designated, in their entirety, as 20, 21 and 22. Actually these leads, diagrammatically disclosed at Fig. 1, are composed of several sections, or components, which will be explained as the description proceeds. In returning to Fig. 2, it is to be noted that I designate the all-important resistance wire element as 23 and show, in combination with it, the novel structure of my invention which protects it.

As briefly indicated in the preceding introduction, it is necessary that the resistance wire 23 be associated as intimately with temperature condition as possible. It is also essential that the comparatively delicate resistance wire be mechanically protected from solid and fluid matter found at the location of the temperature condition. A housing has been provided for resistance wire 23 which gives it adequate physical protection while allowing the wire to change in resistance without additional bias, or alteration, due to mechanical stress.

The actual size of the resistance wire 23, found to be practical with the commercial networks available, has been established as .004" in diameter and of a length which gives 200 turns on a .065" mandrel. The material of this wire is molybdenum, which has a linear rise in resistance with respect to a temperature variation up to 1500 F. A molybdenum wire in these dimensions, is also satisfactory from the point of reproducibility of its resistance value over the range and the small amount of hysteresis as the resistance fluctuates over its range.

The molybdenum resistance wire coil 23 is then centrally suspended within a dead soft hydrogen annealed stainless steel tube having an outside diameter in the order of 3/16 of an inch. Stainless steel has been selected for the material of this tube for having a high degree of resistance to corrosion, in general, and an ability to be cold worked without becoming brittle. The tube is annealed in an atmosphere of hydrogen in order to eliminate scale which would be a detrimental impurity with respect to the material of wire 23. This protective sheath of stainless steel has been designated as 24, and it is this body which is exposed directly to the temperature condition and through which the heat is transferred, substantially directly, to the resistance wire 23.

Each end of the resistance wire 23 is secured to a nickel wire lead incorporated, diagrammatically, in leads 20, 22 of Fig. 1. These sections of the leads attached directly to the resistance wire 23 are designated 25, 26. They are disclosed as extending from the wire 23, along the sheath 24 and out of said sheath a short distance. Details of the juncture between these leads 25 and 26 to the wire 23 are disclosed subsequently. These leads are made of Driver Harris "L" nickel which has been dead soft hydrogen annealed on its ends making juncture with resistance wire 23. A practical length for sheath 24 is 14", and with the 200 turns of coiled wire 23 stretched out to a 4" or 8" length, a 6" length for each of leads 25, 26 has been found practical for the fabrication of the combination.

With the leads and wire 23 suspended vertically and centrally within sheath 24, a granular insulating material, such as magnesium oxide or aluminum oxide, is carefully packed within the sheath 24 and about the coils of wire 23 as well as the leads 25 and 26. The size of the particles of this granular refractory has been carefully considered in connection with the physical properties of the refractory available. Aluminum oxide is quite soft and the size of each particle of this material is not generally critical. However, magnesium oxide is generally quite hard and has been ground to a size which will pass a 200 mesh screen but not a 325 mesh screen. Reduced to this size, magnesium oxide will not cut into and deform the delicate wire 23.

After the granular refractory material, having good electrical insulating properties as well as the ability to pass heat quickly and efficiently from the sheath 24 to the wire 23, has been packed within sheath 24 the entire structure is subjected to a swaging operation which reduces the cross-sectional area approximately 11%. It has been observed that this percentage of reduction compacts the granulated refractory about wire 23 sufficiently tight that the resulting combination of the three elements of sheath, leads and wire may be regarded as a homogeneous unit without the wire 23 having mechanical stresses induced in it to alter its electrical resistance characteristics.

Due to the violence of the swaging operation, it was necessary to place a plug about leads 25 and 26 and in the ends of sheath 24. This plug is needed only during this process of swaging, to prevent loss of the packed granular refractory from within the sheath 24. Consequently, the plug may be formed, in this first instance, of any readily formed material which can be easily machined and does not absorb atmospheric moisture with consequent loss of dimensional stability. After the swaging is completed, part of the sheath 24 is cut back to remove the plug and expose a uniform dimension of leads 25 and 26. The leads usually end up with about a 4½" length from wire 23 after the swaging and fabrication.

The ends of sheath 24 are next permanently sealed, the exact relationship of the resulting components of this seal being subsequently disclosed. For present purposes it is only necessary to realize that the leads 25 and 26 extend through the permanent seal at the ends of sheath 24 for juncture with another section of leads going up to the terminals connecting with the units of bridge 1. The extension leads 27 and 28 are of the same material as leads 25 and 26 and are joined thereto by simple spot welds along overlapped sections of both.

At this point it is important to note that with sheath 24 exposed to a temperature condition, the leads coming out of this protective sheath are subjected to many and varied gaseous conditions which would rapidly deteriorate the leads. The temperature conditions in and around power producing apparatus and commercial processes are, in many of their characteristics, unknown. Several theories have been advanced as to the exact nature of the deterioration which has been experienced and the remedies for it. Without further analysis of the detrimental effects, it is sufficient to state that the present invention is directed to isolation of both the leads and the resistance wire 23 from these detrimental conditions. The practical embodiment to carry out this object is partially disclosed in secondary protective sheaths 29 and 30 fitted over the ends of sheath 24. Sheaths 29, 30 and 24 are filled with gases which provide an atmosphere of predetermined properties which is protective of the molybdenum material of wire 23 as well as the nickel of the leads. These gas-retaining sheaths, 29 and 30, are also formed of stainless steel and are given lengths up to 60" in order to extend the protection well back from the condition. Sheath 24, having been given a U-bend of the smallest practical radius, is telescoped into each of these gas-retaining sheaths 29, 30 and united thereto by welds.

Both the insertion of the protective atmosphere into the sheaths 29, 30 and 24, as well as retention therein, offer problems. Small capillaries 31 and 32, are silver soldered into holes bored into the sides of sheaths 29 and 30. The protective gas is fed into one of these capillaries until all of the sheaths, 24, 29 and 30, are thoroughly purged of air. Both capillaries are then pinched off in a conventional manner. The enclosure of the assembly is completed by plug structures 33, 34 which simultaneously seal the gas in the sheaths 29, 30, pass leads 27, 28 outside and insulate these leads from the walls of their sheaths. As an example of one embodiment of these plugs 33, 34, the Fusite terminal HT107, manufactured by the Fusite Corp., has been successfully used.

A problem still remains of supporting the leads 27, 28 within each of their sheaths, throughout their lengths. Consequently, there has been provided an elongated insulator which abuts both the ends of sheath 24 and the Fusite terminals 33, 34. These insulators, designated 35, 36 have at least one practical embodiment in a product designated McDanel refractory ST11618.

Figure 3:
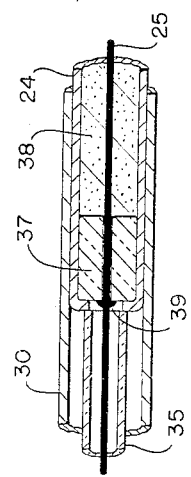
Fig. 3 is a sectioned elevation of a detail of Fig. 2.

Proceeding to Fig. 3, details of the sealing of the ends of sheath 24 may be more clearly discerned. The upper end of sheath 24 has been arbitrarily chosen for disclosure, with its associated gas-retaining sheath 30, lead 25 and elongated insulator 35. The permanent plug placed at the end of the sheath 24 is clearly discerned with relationship to the lead 25 and the packed granular refractory which is designated 38. The purpose of this plug is both to retain the refractory 38 within sheath 24 during service when the entire unit is subjected to vibration and shock from external sources and to form a barrier between the gas in 24 and that in 29 and 30. Consequently, the body of plug 37 is carefully sized to fit within sheath 24 and bored to pass lead 25 with a minimum of clearance. Before sheath 24 is given its U-bend, each end is carefully spun-over to form a retaining shelf which captures the plug 27 between the packed refractory 38 and the lip formed by the spinning-over. Although the seam between the plug and the inner wall of sheath 24 is easily made as tight as necessary, it is rather difficult to size the hole for lead 25 closely enough to prevent even the finely granulated material 38 from being vibrated up along the lead 25 and out of sheath 24. Consequently, at least one structure has been developed, comprised of a small drop of solder placed about lead 25 at 39 to complete the seal.

Although it is practical to make the seal, centered about 37, mechanically effective against the vibration of the solid refractory from tube 24 and yet pervious to gas, it is also possible to make the seal gas-tight as well. If the seal were gas pervious it would be possible to insert a selected gas, under pressure, into capillary 31 or 32 and have it purge sheath 29, tube 24 and sheath 30 of air. Both capillaries could then be pinched off to complete the sealing of selected gas within the structure. If it were desirable to use a material for resistance wire 23 other than molybdenum, say nickel or platinum, it might be desirable to seal a gas of certain properties in tube 24 but maintain a gas of different properties in sheaths 29 and 30. Dependent on the particular properties of the element 23 and leads 25 and 26, either a reducing, an oxidizing or an inert gas might be desired in these tubes and sheaths. Prior to assembly of tube 24 with the sheaths, the tube can be filled with one selected gas by sealing plug 37 in an atmosphere of the gas. The sheaths 29 and 30 can then be welded into place on tube 24, a vacuum created by exhausting through capillaries 31 and 32 and a second gas of predetermined properties drawn into the sheaths through the individual capillaries. The completed assembly will have the two types of gas in the thermometer effectively separated and serving in their individual functions as protective layers of gas about the resistance element and leads.

Figure 4:
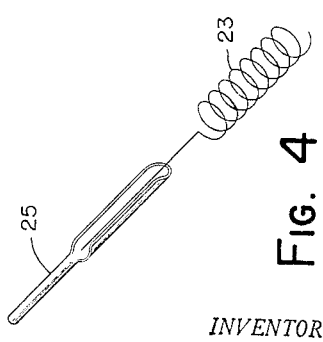
Fig. 4 is a perspective view of a detail of the invention as partially assembled.

Another important detail of the assembly of Fig. 2 is the juncture made between the leads 25, 26 and the ends of resistance wire 23. Fig. 4 discloses the necessary relationship of these two bodies to make a satisfactory electrical junction. As previously disclosed, the ends of leds 25 and 26 are dead soft annealed in hydrogen in order that they may be flattened out for about ⅜" of their length. The resulting leaf of material may be formed into a tube, shown partially completed in Fig. 4. The end of wire 23 is inserted into this tube which is then flattened over the wire and given spot welds to complete the juncture.

The electrical junction might be made more easily than in the manner specifically disclosed if material for leads 25 and 26 is available in capillary form. With leads 25 and 26 in the form of small tubes the working indicated, to accommodate wire 23, shown in Fig. 4, is unnecessary. With the wire end inserted, the tube-lead could be flattened and spot-welded to complete the electrical junction.

Figure 5:
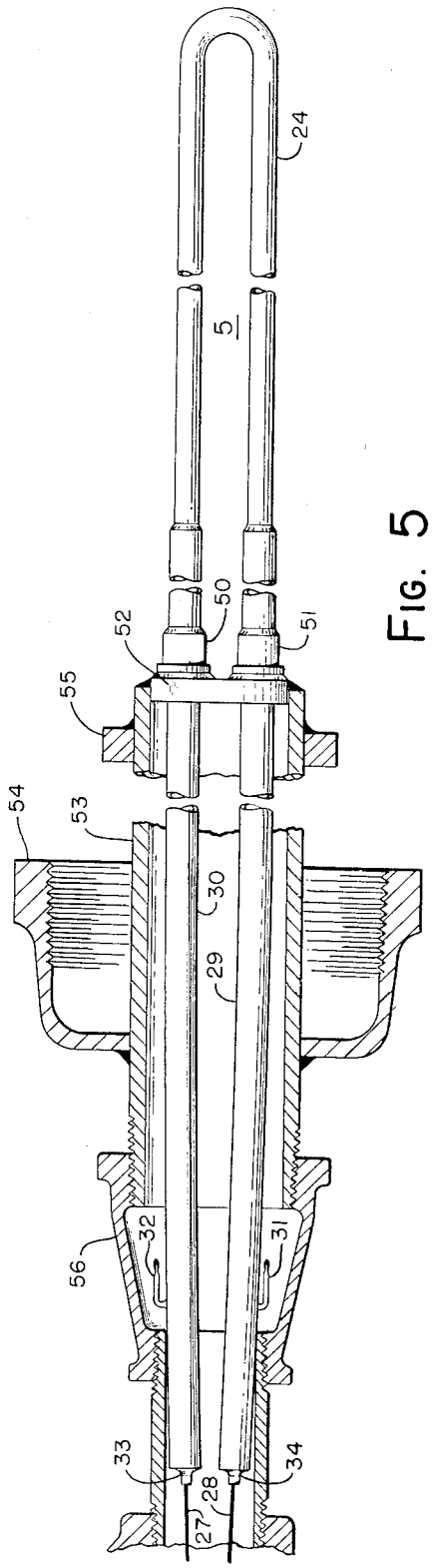
Fig. 5 is a partially sectioned elevation of the invention assembled in one complete mounting embodiment.
Figure 6:
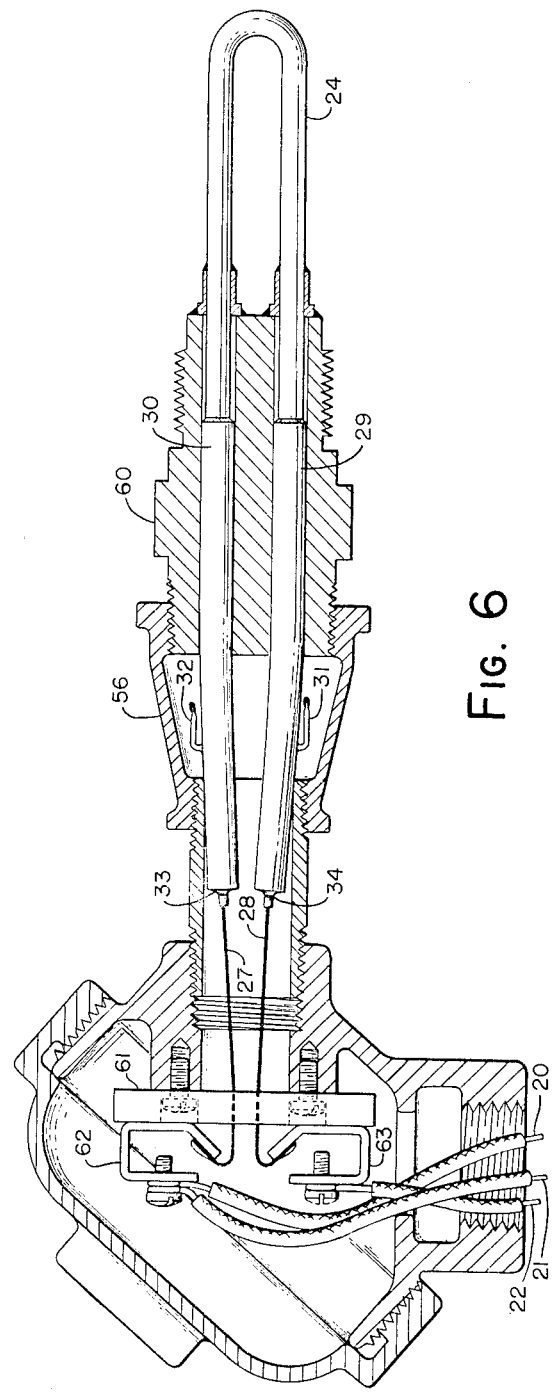
Fig. 6 is a partially sectioned elevation of a second form of a complete mounting embodiment for the invention.

Going now to Figs. 5 and 6, there are disclosed two practical types of mounting for the assembly of Fig. 2 so as to associate the resistance wire 23 with a condition of temperature. The various components of Fig. 2 are disclosed in their external appearance from sheath 24 to plugs 33 and 34. In Fig. 5 an assembly of two welding adaptors 50 and 51 and an end plate 52 are welded together and to the gas-retaining sheaths 29 and 30. This resulting assembly may then be slipped into a protecting pipe 53 and end plate 52 welded to the end of said pipe. A pipe coupling 54 is then welded to the protecting pipe 53 and a centering ring 55 is spaced therefrom to form a combination which will cooperate with a pipe leading directly to the condition of temperature and with which the pipe coupling joins while the centering ring prevents the protecting pipe 53 from vibrating within such mounting pipe.

With the protecting pipe 53, pipe coupling 54 and centering ring 55 holding the entire assembly, including resistance wire 23, into the condition, there remains but the problem of placing a reducing coupling 56 on the other end of protecting pipe 53 for completing the assembly with the standard parts of a conventional terminal socket head.

The complete mounting assembly of Fig. 5 is adapted for presenting the resistance wire 23 to a condition of comparatively low pressure. For a comparatively high pressure condition, Fig. 6 discloses a structure centering around a solid welding head 60 to which is screwed and welded to components of the structure heretofore disclosed. This solid welding head 60, screwed into a container of comparatively high pressure, for the measurement of temperature therein, is inherently more sturdy and resistant to pressure conditions than the protecting pipe 53 of Fig. 5. The conventional socket head, for accommodation of the terminals between leads 27 and 28 and the connections of bridge 1, is disclosed. Leads 27 and 28 are shown coming up to insulator base 61 on which are mounted terminals 62 and 63. The leads 20, 21 and 22 which go to bridge 1 are shown in their practical connection to terminals 62 and 63 so as to incorporate resistance wire 23, as the temperature responsive element, in bridge 1.

What I claim as new, and desire to secure by Letters Patent of the United States, is:

1. A temperature responsive resistance element for a balanceable network indicating temperature conditions including, a tube of stainless steel swaged to substantially an 11% loss in cross-sectional area, a metallic filament arranged centrally and longitudinally within the tube as the element of the combination which is resistance-responsive to the temperature conditions, a refractory of granular form filling the space between the filament and the tube compacted by the swaging to give a combination responding to mechanical working as though it were a homogenous body, leads spot-welded to the ends of the metallic filament for electrical connection to a balanceable network, a sheath for each end of the tube with their inside diameters sized to accommodate the swaged tube and partially overlapping the outside length of the tube, an extension lead welded to each filament lead inside the sheath and extending beyond their sheath lengths, a tubular insulator over each extension and filament lead within each sheath, an insulator-seal passing each extension lead out of its sheath and sealing each sheath gas-tight, and means for purging and sealing each sheath and tube with a gas of selected characteristics.

2. The element of claim 1 including ceramic bodies inserted into the ends of the tube subsequent to swaging and capturing the compacted refractory between them while the leads are centrally threaded therethrough.

3. The element of claim 2 including bodies of solder bonded to the leads and ceramic bodies.

4. The element of claim 3 wherein the leads make electrical connection with the filament through a junction formed by flattened ends of each lead rolled over the filament ends and spot-welded.

5. A temperature responsive primary element including in combination, a metallic tube swaged to substantially an 11% reduction of cross-sectional area, a metallic filament of coiled form arranged centrally and longitudinally within the tube in bringing it as close to the internal wall of the tube as consistent with mechanical support within and electrical insulation from the tube, a refractory of granular form filling the space between filament and tube and compacted by the swaging to the degree which provides mechanical support and prevents positional change and avoids electrical resistance change from mechanical distortion, lead wires extending into each end of the tube to make electrical connection with each end of the filament, a sheath for each end of the tube with an inside diameter sized to accommodate the swaged tube and a lead wire and partially overlapping the outside length of the tube, and means for purging and sealing each sheath and tube with a gas of selected characteristic.

References Cited in the file of this patent

UNITED STATES PATENTS

| | | |
|---|---|---|
| 1,359,400 | Lightfoot | Nov. 16, 1928 |
| 2,021,491 | Ruben | Nov. 19, 1935 |
| 2,131,065 | Obermaier | Sept. 27, 1938 |
| 2,594,921 | Hansard | Apr. 29, 1952 |

FOREIGN PATENTS

| | | |
|---|---|---|
| 312,932 | Great Britain | Sept. 30, 1930 |